Dec. 13, 1927.
L. H. BRODRICK
1,652,755
CONTAINER
Filed April 10, 1925
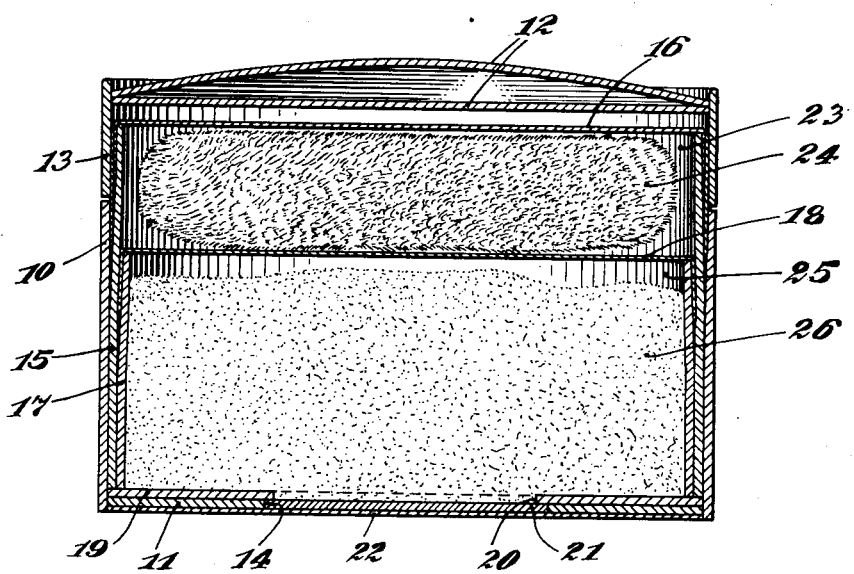
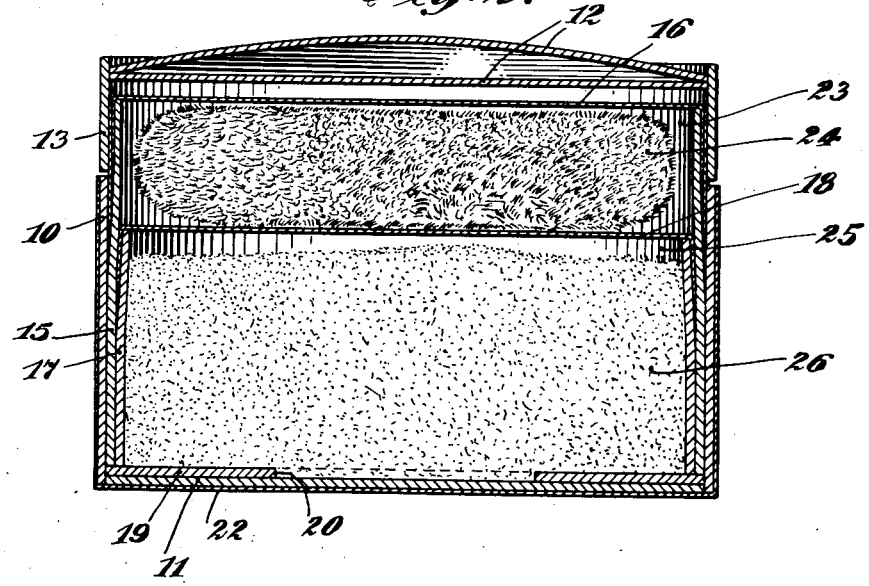
INVENTOR
Leo H. Brodrick
BY
his ATTORNEY Patented Dec. 13, 1927.

1,652,755

UNITED STATES PATENT OFFICE.

LEO H. BRODRICK, OF NEW YORK, N. Y.

CONTAINER.

Application filed April 10, 1925. Serial No. 22,055.

My invention relates to containers and refers particularly to containers having separate compartments suitable for receiving a powder puff and a quantity of face powder.

As face powders, and similar powders, are not capable of application without the medium of a powder puff, or other similar devices, it is evident that an effective container for the powder must also be capable of carrying a powder puff, or other such device.

Further, it is evident that druing the commercializing of the package, that is, during its shipment and selling periods, it should be so constructed that the powder can not come in contact with the puff, and that it should be hermetically sealed in order to prevent the contamination of the powder and its loss through leakage from the container.

Further, a container of this character should be so constructed that the contents may be readily reached for use.

Containers of this character are usually produced in box factories and then shipped to the powder manufacturers or dealers, in order that they may be filled with the desired powder. It is evident, therefore, that containers of this description should be so constructed that they may be delivered to the powder manufacturer in such condition as to require a minimum of operations in their filling and closing.

My device possesses all of the above, and other, advantageous features and presents an attractive, hygienic, perfectly sealed container, the filling of which requires but a few operations, thus making it particularly advantageous to the powder producer.

In the particular forms of the device of my invention shown in the accompanying drawings, similar parts are designated by similar numerals.

Figure 1 is a vertical cross-section of one form of my device.

Figure 2 is a vertical cross-section of a modified form of my device.

The particular form of the device of my invention shown in the Figure 1 of the accompanying drawings comprises an outside casing comprising the annular bottom side 10, to which is attached the outside casing bottom 11. A cover comprises the top 12, and the cover side 13 capable of abutment upon the bottom side 10. The casing bottom 11 has an opening 14.

Within the outside casing is an inner casing comprising the side 15, the upper opening of which is closed by means of an imperforate fragile and preferably a transparent material 16. The inner casing side 15 may be glued, or otherwise attached to the outside casing bottom side 10. The side 15 extends above the side 10.

Within the inner casing and preferably attached thereto is an interior member comprising the interior side 17, the upper opening of which is covered by the imperforate fragile top 18. The side 17 does not extend to the upper extremity of the side 15.

A sub-bottom member 19 is fixedly attached to the bottom 11 and has an opening 20 therein. The opening 20 is smaller than the opening 14, thus forming a shoulder upon which the closure member 21 may rest. A sheet of paper 22 covers the bottom of the device and holds the closure member in position.

It will be seen, from the above, that the container when assembled comprises an upper chamber 23 in which a powder puff 24 may be placed and a lower chamber 25, in which face powder 26 may be placed.

If desired, the container may be delivered to the powder manufacturer with a powder puff 24 placed therein, and without the closure 21 being affixed. The manufacturer can then introduce his powder through the opening 14, insert the closure 21 and attach the paper.

The preparation of the device by the powder manufacturer, therefore, consists of only three operations.

When it is desired to use the contents of the container, the transparent member 16 is broken, the puff 24 is removed and the fragile member 18 broken to gain access to the powder 26.

In the modification of my device shown in Figure 2, the bottom 14 has no opening therein, and in case the device is delivered to the powder manufacturer without the sides 10, 15 and 17 being fixedly attached to each other.

In preparing the modification shown in Figure 2, the powder manufacturer removes the member 15 from within the member 10 and removes the member 17 from within the member 15. He then has the three separated members 10, 17 and 15, and the cover. He places member 15 upside down and places a powder puff therein, he then places member 17 within member 15 and introduces his powder therein. He then places member 10 over the two above assembled members and places the paper 22 thereon and the container is filled and closed.

The several members may be glued together during their assembling, in order to insure permanency.

From the above it will be noted, that my device comprises a container in which there are two compartments, one suitable for a powder puff and one suitable for face powder, hermetically sealed prior to use, and access to the powder puff and the powder may be obtained by the breaking of two friable covering members.

I have shown an annular device but my invention is not limited to containers of this particular form.

By "fragile" I mean those sheets of substances which are readily ruptured as paper, parchment, cellophane and other substances having this property.

My device, therefore, presents a hygienic, economic and efficient container, the application of which, by the powder manufacturer, allows him to readily assemble a powder puff and a quantity of powder in separate compartments and enables the individual user to readily obtain access to the contents.

I do not limit myself to the particular size, shape, number, material or arrangement of parts as shown and described, as these are given simply as a means for clearly describing the device of my invention.

What I claim is:—

In a container, in combination, a bottom member having an upwardly extended side, a first casing within the bottom member fixedly attached to the bottom member side and having a non-collapsible side extending above the bottom member side, a separate sheet of imperforate fragile material extending over the upper open portion of the first casing, an interior casing fixedly attached to the first casing side and within the lower portion of the first casing having an upwardly extended non-collapsible side lower than the first casing side, a separate sheet of imperforate fragile material over the upper open portion of the interior casing, and a cover for the device having a downwardly extended side flange the edge of which is capable of abutment upon the upper edge of the bottom member side.

Signed at New York city, in the county of New York and State of New York, this 9th day of April, 1925.

LEO H. BRODRICK.